United States Patent
Beaufrere et al.

(10) Patent No.: US 12,043,082 B2
(45) Date of Patent: Jul. 23, 2024

(54) POWER MANAGEMENT SYSTEM FOR A TRANSPORT REFRIGERATION UNIT

(71) Applicant: Carrier Fire & Security EMEA BV, Diegem (BE)

(72) Inventors: Florian Beaufrere, Franqueville Saint Pierre (FR); Gael Ducher, Franqueville Saint Pierre (FR); Jamal Zarrabi, Franqueville Saint Pierre (FR)

(73) Assignee: CARRIER FIRE & SECURITY EMEA BV, Diegem (BE)

( * ) Notice: Subject to any disclaimer, the term of this patent is extended or adjusted under 35 U.S.C. 154(b) by 288 days.

(21) Appl. No.: 17/713,613

(22) Filed: Apr. 5, 2022

(65) Prior Publication Data

US 2022/0314738 A1 Oct. 6, 2022

(30) Foreign Application Priority Data

Apr. 6, 2021 (EP) .................................... 21167032

(51) Int. Cl.
*G06F 17/00* (2019.01)
*B60H 1/00* (2006.01)
(Continued)

(52) U.S. Cl.
CPC ..... *B60H 1/00428* (2013.01); *B60H 1/00364* (2013.01); *B60H 1/00764* (2013.01);
(Continued)

(58) Field of Classification Search
CPC ............ B60H 1/00428; B60H 1/00364; B60H 1/00764; B60H 1/00771; B60H 1/00014;
(Continued)

(56) References Cited

U.S. PATENT DOCUMENTS

| 7,743,616 B2 | 6/2010 | Renken et al. |
| 8,776,928 B2 | 7/2014 | Stover, Jr. et al. |

(Continued)

FOREIGN PATENT DOCUMENTS

| CA | 2457216 A1 * | 8/2004 | ............... B60K 1/00 |
| CN | 100402330 C * | 7/2008 | ............. B60K 6/442 |

(Continued)

OTHER PUBLICATIONS

Dynamic tag e-axle and method for controlling a drivetrain having a dynamic tag e-axle (Year: 2024).*

(Continued)

*Primary Examiner* — Ronnie M Mancho
(74) *Attorney, Agent, or Firm* — CANTOR COLBURN LLP

(57) ABSTRACT

A vehicle for transporting goods, a tractor-trailer system for transporting goods, and a method of operating a power management system for powering a transport refrigeration unit. The vehicle for transporting goods includes: an axle; a transport refrigeration unit; and a power management system for supplying power to the transport refrigeration unit. The power management system includes: a generator configured to be selectively coupled to an axle of the vehicle, wherein the generator is configured to generate electricity when coupled to the axle; and a controller configured to monitor a speed of the vehicle and to selectively couple and decouple the generator from the axle. The controller is configured to determine that the vehicle is in a first state and decouple the generator from the axle when the vehicle is in the first state, wherein the speed of the vehicle is increasing in the first state.

15 Claims, 4 Drawing Sheets

(51) Int. Cl.
*B60L 50/61* (2019.01)
*B60L 58/13* (2019.01)
*B60W 20/14* (2016.01)
*B60W 30/18* (2012.01)
*H02J 7/14* (2006.01)

(52) U.S. Cl.
CPC ............... *B60L 50/61* (2019.02); *B60L 58/13* (2019.02); *B60W 20/14* (2016.01); *B60W 30/18127* (2013.01); *B60W 2510/244* (2013.01); *H02J 7/1415* (2013.01)

(58) Field of Classification Search
CPC ... B60H 1/00357; B60H 1/3208; B60L 50/61; B60L 58/13; B60W 20/14; B60W 30/18127; B60W 2510/244; B60W 2520/10; H02J 7/1415; B60K 25/08
USPC .......................................................... 701/22
See application file for complete search history.

(56) References Cited

U.S. PATENT DOCUMENTS

| | | | |
|---|---|---|---|
| 9,194,286 | B2 | 11/2015 | Burnham et al. |
| 9,389,007 | B1 | 7/2016 | McKay |
| 9,415,660 | B2 | 8/2016 | Koelsch |
| 9,694,712 | B2 | 7/2017 | Healy |
| 10,766,478 | B2 | 9/2020 | Healy et al. |
| 10,821,853 | B2 * | 11/2020 | Healy ................ B60W 20/12 |
| 10,889,288 | B2 | 1/2021 | Richter et al. |
| 10,899,192 | B2 * | 1/2021 | Larson ............... B60H 1/00014 |
| 11,479,144 | B2 * | 10/2022 | Healy .................... B60K 11/06 |
| 2005/0000739 | A1 * | 1/2005 | Leclerc ................... B60K 6/48 903/951 |
| 2007/0272116 | A1 | 11/2007 | Bartley et al. |
| 2008/0174174 | A1 | 7/2008 | Burns et al. |
| 2011/0042154 | A1 * | 2/2011 | Bartel ................ B60W 10/184 180/11 |
| 2011/0094807 | A1 | 4/2011 | Pruitt et al. |
| 2015/0076949 | A1 * | 3/2015 | Alim ..................... H02K 53/00 74/DIG. 9 |
| 2015/0246593 | A1 * | 9/2015 | Larson ............... B60H 1/00428 62/236 |
| 2017/0217280 | A1 * | 8/2017 | Larson ............... B60H 1/00764 |
| 2018/0264951 | A1 | 9/2018 | Kooi |
| 2019/0070944 | A1 * | 3/2019 | Soto ......................... B60K 6/48 |
| 2019/0329650 | A1 | 10/2019 | Quill |
| 2020/0141746 | A1 * | 5/2020 | Srnec ................. G01C 21/3691 |
| 2020/0180496 | A1 | 6/2020 | Burchill et al. |
| 2020/0353806 | A1 * | 11/2020 | Knoche et al. ..... B60B 27/0015 |
| 2020/0391574 | A1 | 12/2020 | Ducher |
| 2021/0252947 | A1 * | 8/2021 | She ......................... B60K 11/06 |
| 2023/0347872 | A1 * | 11/2023 | Gesang ..................... B60L 7/18 |

FOREIGN PATENT DOCUMENTS

| | | | | |
|---|---|---|---|---|
| EP | 3437913 A1 | * | 2/2019 | ............ B60B 27/001 |
| EP | 3647087 A1 | * | 5/2020 | ......... B60H 1/00264 |
| EP | 3647088 A1 | | 5/2020 | |
| FR | 3032166 A1 | * | 8/2016 | ............... B60K 6/48 |
| WO | 2019219997 A1 | | 11/2019 | |
| WO | 2019229490 A1 | | 12/2019 | |
| WO | 2020068475 A1 | | 4/2020 | |
| WO | 2020068556 A1 | | 4/2020 | |
| WO | 2020068637 A1 | | 4/2020 | |
| WO | 2020069107 A1 | | 4/2020 | |
| WO | 2020072706 A1 | | 4/2020 | |
| WO | WO-2020068556 A1 | * | 4/2020 | ......... B60H 1/00014 |
| WO | 2021127647 A1 | | 6/2021 | |

OTHER PUBLICATIONS

European Search Report for Application No. 21167032.8; Issued Oct. 13, 2021; 5 Pages.

European Search Report for Application No. 21178370.9; Issued Nov. 29, 2021; 8 Pages.

\* cited by examiner

POWER MANAGEMENT SYSTEM FOR A TRANSPORT REFRIGERATION UNIT

FOREIGN PRIORITY

This application claims priority to European Patent Application No. 21167032.8, filed Apr. 6, 2021, and all the benefits accruing therefrom under 35 U.S.C. § 119, the contents of which in its entirety are herein incorporated by reference.

TECHNICAL FIELD OF INVENTION

The present invention relates to a vehicle for transporting goods, a tractor-trailer system for transporting goods, and a method of operating a power management system for powering a transport refrigeration unit.

BACKGROUND OF THE INVENTION

Transport refrigeration units (TRUs) transport perishable or temperature-sensitive goods and consumables within logistics networks. TRUs generally regulate a monitored environment within a storage area, such as a container or trailer, where the goods are to be stored during transit. The monitored environment is regulated using a refrigeration system or the like, which in turn is powered by an energy source. Traditionally, the energy source for such refrigeration systems have been internal combustion engines.

TRUs are implemented or integrated within a storage container, trailer or the like. The trailer or container is then coupled with or loaded onto a truck/tractor, train or other vehicle, which transports the goods to their intended destination. The driving vehicle is typically powered by a separate internal combustion engine.

The transportation of goods, such as for the food industry, has historically been dependent on fossil fuels and other non-renewable energy sources. These sources not only supply power to the vehicles transporting goods, but also the equipment regulating the storage environment of these goods. Non-renewable fuels are therefore a large expense within the industry. Non-renewable fuels, such as petroleum and diesel, are also damaging to the environment. There is a desire to reduce fuel consumption within the industry.

In recent years, this has been partially achieved by implementing electrical power sources to power the TRU, rather than internal combustion engines. Such electrical power sources may be charged using electrical energy from an electrical grid, and may also be recharged by energy harvesting devices such as solar panels, electrical generators and the like. The use of electrical power sources and energy harvesting devices for powering TRUs has reduced fossil fuel consumption within the industry. However, there is still a need to further optimise and/or reduce fuel consumption during the transportation of goods.

SUMMARY OF THE INVENTION

Viewed from a first aspect of the present invention, there is provided a vehicle for transporting goods, the vehicle comprising: an axle; a transport refrigeration unit; and a power management system for supplying power to the transport refrigeration unit; wherein the power management system comprises: a generator configured to be selectively coupled to the axle of the vehicle, wherein the generator is configured to generate electricity when coupled to the axle; and a controller configured to monitor a speed of the vehicle and to selectively couple and decouple the generator from the axle; wherein the controller is configured to determine that the vehicle is in a first state and decouple the generator from the axle when the vehicle is in a first state, wherein the speed of the vehicle is increasing in the first state; and wherein the controller is configured to determine that the vehicle is in a second state and couple the generator to the axle, wherein the speed of the vehicle is substantially constant in the second state.

The electric generator is configured to generate electricity when coupled to the axle. The power management system may hence be powered, or regenerate power, using the electric generator via the rotation of the axle. That is, the electric generator, when coupled to the axle, is driven by the axle. The transport refrigeration unit may hence be powered by electricity generated from the electric generator, which in turn reduces or removes the transport refrigeration unit's dependence on non-renewable/fossil fuels.

As stated above, when coupled to the axle the generator can be driven by the axle such that electricity is generated. However, coupling the generator to the axle increases the torque required to turn the axle, and the vehicle will experience a greater load due to the torque of the generator acting on the axle. Accordingly, an engine torque will be needed to cause the vehicle to accelerate or remain at a constant speed. Providing a torque requires more energy, which in turn leads to a greater consumption of fuel or energy to drive the vehicle. During acceleration, engine fuel efficiency typically decreases, meaning that operating the generator at this time also reduces the effective fuel efficiency of power generation by the generator.

By monitoring if the speed of the vehicle is increasing, the power management system may selectively couple or decouple the generator from the axle. When the speed of the vehicle is substantially constant, i.e. the vehicle is not accelerating or decelerating, the vehicle may be in a suitable state for electricity to be generated, e.g. to power the TRU. However, when the rate of change of speed of the vehicle is increasing the generator may be decoupled from the axle, such that the torque acting on the axle, and hence the engine, is reduced. The force required to turn the axle is decreased, and hence fuel consumption during acceleration of the vehicle may be reduced. As a result, fuel may be more efficiently consumed when driving vehicles which comprise a generator coupled to an axle.

The generator may also be referred to as an axle-generator, as the generator is driven by the rotation of the axle when coupled, to generate electricity. The generator may be an induction generator.

The axle may be a passive axle, i.e. it may be rotated due to a contact force between a wheel connected to the axle and a driving surface. Thus electrical energy may be harvested from the motion of the vehicle, via the rotation of its wheels.

The vehicle may be a passive vehicle, i.e. not comprising a motor or engine for driving the vehicle, such as a trailer, goods wagon or the like. The vehicle may not be capable of providing a driving/motive force itself. Instead, the passive vehicle may be driven by a respective driving vehicle, such as a truck, train or the like, which provides a driving/motive force to the vehicle. Accordingly the axle may be indirectly driven via the driving force provided by the driving vehicle, e.g. through a contact force with a road surface, rail or other suitable driving surface.

The vehicle may be an active vehicle, such as a box lorry or van. That is, the vehicle may comprise an engine which provides a driving/motive force to the vehicle. In addition, the vehicle may comprise a storage area where the TRU is located and where goods may be contained. The vehicle may hence be capable of providing a driving/motive force itself rather than being a vehicle which is towed by a driving vehicle. The vehicle may comprise an active axle through which the driving force is delivered, and a passive axle which is indirectly driven via the driving force, e.g. through a contact force with a road surface, rail or other suitable driving surface. The generator may be selectively coupled to the passive axle. In such a system the power management system may generally operate independently of the vehicle engine.

The vehicle may comprise a passive vehicle and an active vehicle. The passive vehicle may be driven by the active vehicle. For example, the vehicle may be a tractor-trailer system. The axle may be an axle of the tractor. The axle may be an axle of the trailer. The TRU may be housed within the trailer.

The generator may be configured to power the transport refrigeration unit. That is, the electricity generated by the generator when coupled to the axle may be directly supplied to the transport refrigeration unit.

The power management system may comprise an energy storage device. The energy storage device may be operable to power the transport refrigeration unit. The energy storage device may be configured to store electrical energy. The energy storage device may be a rechargeable battery, capacitor or the like. The energy storage device may be charged by the generator. The energy storage device may supply electricity to the TRU. The energy storage device may be charged via an electrical grid, when the vehicle is stationary.

The controller may be configured to determine a power demand of the transport refrigeration unit. The controller may also be configured to determine a power generation rate of the generator, i.e. a rate at which electricity is generated when the generator is coupled to the axle. If the power generation rate exceeds the power demand, the controller may be configured to recharge the energy storage device and power the transport refrigeration unit using the generator. If the power demand exceeds the power generation rate, the controller may be configured to power the transport refrigeration unit via the generator and the energy storage device simultaneously.

The energy storage device may be selectively recharged by the generator. That is, the generator may recharge the energy storage device when a state-of-charge of the energy storage device is below a predetermined threshold. The threshold may be at least 80% of the capacity of the energy storage device, and optionally at least 90% of the capacity of the energy storage device. Additionally or alternatively, the generator may recharge the energy storage device when the generator generates surplus electricity. That is, when the rate at which the generator generates electricity exceeds the power demand of the TRU, the surplus electricity generated by the generator may be used to recharge the energy storage device. This may be the case, for example, at high vehicle speeds. Hence, electricity generated by the generator is efficiently harvested such that the TRU may be operated using regenerated electricity where possible. This may increase the time the vehicle may operate between destinations without requiring the energy storage device to be recharged. This may also increase the efficiency of fuel consumption by the vehicle, as energy is more efficiently harvested by the generator and the generator may be decoupled from the axle when appropriate.

The energy storage device and the generator may simultaneously power the TRU. For example, if the power demand of the TRU exceeds the rate at which the generator is generating electricity when coupled to the axle, the energy storage device may supplement the power provided by the generator. This may be the case, for example, at low vehicle speeds. Accordingly, the TRU may be powered by the generator and the energy storage device in tandem such that the power demands of the TRU are always met. Further, by powering the TRU using the generator in tandem with the energy storage device, the energy storage device may discharge energy at a slower rate than if the TRU were to be powered solely by the energy storage device. That is, by prioritising the use of regenerated electricity for powering the TRU the lifetime between charges for which the TRU may be adequately powered by the power management system is increased.

If the generator is decoupled from the axle, and hence no electricity is being generated by the generator, the TRU may be powered solely by the energy storage device. Accordingly the generator need not always be coupled to the axle, and may be decoupled from the axle when necessary whilst still adequately powering the TRU. This may be the case, for example, when the vehicle is accelerating or the vehicle is stationary. Hence the TRU may be adequately powered at all times, and fuel consumption may be decreased during acceleration of the vehicle.

The TRU may also be able to be powered solely by the generator, when the generator is coupled to the axle. For example, if the power demand of the TRU is met by the generation rate of the generator, the generator may supply power directly to the TRU.

The rate of change of speed of the vehicle may be determined to be increasing and/or decreasing when the magnitude of the rate of change of speed of the vehicle is greater than at least 0.1 m/s2, at least 0.2 m/s2, at least 0.3 m/s2, at least 0.4 m/s2, at least 0.5 m/s2. The rate of change of speed of the vehicle may be determined to be substantially zero, i.e. the vehicle speed may be determined to be constant, for example, when the magnitude of the rate of change of speed of the vehicle is no greater than 0.1 m/s2, at most 0.2 m/s2, at most 0.3 m/s2, at most 0.4 m/s2, or at most 0.5 m/s2, respectively. The vehicle speed may alternatively be considered substantially constant if fluctuations within a predetermined time period are within a certain tolerance. The time period may be less than 1 minute, less than 30 seconds, or less than 10 seconds. The fluctuation tolerance may be a percentage range of the vehicle speed, where the percentage value may be less than 1%, less than 2%, less than 3%, less than 4% or less than 5%. Alternatively, the fluctuation tolerance may be a numerical range, where the tolerance may span a range less than 1 m/s, less than 2 m/s, less than 3 m/s, less than 4 m/s or less than 5 m/s.

By only determining that the vehicle is accelerating when the acceleration of the vehicle is greater than a set threshold, small fluctuations of the vehicle speed, e.g. due to accelerator pedal control by a driver of the vehicle, may be disregarded and the ride may be smoother due to the vehicle not rapidly coupling and decoupling the generator to and from the axle.

The controller may be configured to monitor and/or determine a state-of-charge of the energy storage device.

The vehicle may decouple the generator from the axle when the state-of-charge exceeds a first threshold. The vehicle may keep the generator decoupled from the axle until the state-of-charge of the energy storage device is less than a second threshold. The first threshold is greater than the second threshold.

The controller may be configured to determine that the vehicle is in a third state and couple the generator to the axle when the vehicle is in the third state, wherein the state-of-charge of the energy storage device is lower than a first threshold when the vehicle is in the third state. The vehicle speed may be constant or the vehicle speed may be increasing in the third state. That is, the vehicle may be in a state wherein the controller is configured to couple the generator to the axle when the state-of-charge of the energy storage device is less than the operational threshold.

If the state-of-charge of the energy storage device is above a first threshold, surplus electricity generated by the generator may be delivered to other components of the vehicle, or within the power management system. Alternatively, if the generation rate exceeds the power demand of the TRU, the generator may be decoupled from the axle and the TRU may be powered by the energy storage device, until the energy storage device has discharged a sufficient amount of energy to be recharged by the generator.

Accordingly, in certain circumstances, even if the vehicle is not accelerating the generator may be decoupled from the axle and the rate of fuel consumption may be decreased. Once the state-of-charge has decreased until it is lower than a second, lower threshold, the generator may be coupled to the axle again if the required conditions are met, e.g. if the speed of the vehicle is substantially constant, such that an adequate state-of-charge of the energy storage device is maintained. The first threshold may be greater than the second threshold by at least 5%, by at least 10%, by at least 15%, by at least 20%, or by at least 25%.

As stated above, the controller may be configured to couple the generator to the axle if the state-of-charge of the energy storage device is lower than an operational threshold. The vehicle may be in the third state even if the vehicle is accelerating, when the state-of-charge of the energy storage device is lower than an operational threshold.

The first threshold may be regarded as a minimally acceptable value for the state-of-charge of the energy storage device, such that the transport refrigeration unit may be powered for a minimally acceptable amount of time. The first threshold may be at least 5%, at least 10%, at least 15% or at least 20% of the capacity of the energy storage device. The operational threshold may be less than 75%, less than 50%, or less than 25% of the capacity of the energy storage device. The operational threshold may correspond to a predicted operational lifetime of the TRU. For example, the threshold may be at least 30 minutes, at least one hour, at least two hours or at least three hours. By coupling the generator to the axle when the state-of-charge is lower than the first threshold, recharging of the energy storage device using the generator may be prioritised over optimising fuel consumption when driving the vehicle. This may help prevent the spoiling of goods being transported, and ensure that the TRU is adequately powered during transit of the vehicle.

The controller may be configured to determine the rate of change of speed of the vehicle. The controller may be configured to determine if the vehicle is in a fourth state and couple the generator to the axle when the vehicle is in the fourth state. The rate of change of speed of the vehicle may be decreasing in the fourth state. There are some situations where a deceleration, i.e. where the speed of the vehicle is decelerating, may be the result of driver intervention. In these situations, it is desirable to regenerate energy which would otherwise be lost.

The controller may be configured to determine if the vehicle is braking. The vehicle may be braking in the fourth state. The vehicle may be in a state when the vehicle is braking wherein the controller is configured to couple the generator to the axle. As such energy which would otherwise be lost during braking may be converted into electricity using the generator.

The vehicle may comprise one or more sensors for determining the speed and/or the rate of change of speed of the vehicle. The one or more sensors may be, for example, a wheel speed sensor or an accelerometer.

The vehicle may comprise a position determination device, such as a GPS device. The position determination device may be configured to relay real-time location data to the controller. In this context, real-time location information is intended to mean that the location is the current location of the vehicle, for example within the last 5 seconds, within the last second, or within the last 0.5 seconds. The controller may be able to determine the rate of change of speed of the vehicle based on the real-time location data. For example, the location data when transmitted in real time will allow the controller to determine a change in the vehicle's position with respect to time, such that the rate of change of speed of the vehicle may be determined. Accordingly it can be determined if the generator should be coupled to the axle or not, depending on the state the vehicle is in.

By providing a position determination device to the vehicle, the power management system may be able to determine the rate of change of speed of the vehicle. Additionally, the power management system may be able to determine the rate of change of speed of the vehicle without utilising readings from any sensors which are not part of the power management system and/or the vehicle itself. For example, if the vehicle is a trailer of a tractor-trailer system, the systems which operate the tractor and hence drive/accelerate the tractor and the trailer need not necessarily communicate with the trailer. The power management system may be able to determine independently of the tractor if the trailer is changing speed. Accordingly, in large fleets, the vehicle of the first aspect may be more easily integrated as no extra communication protocols or connections between the tractor and the trailer are required. Additionally or alternatively, existing vehicles may be more easily retrofitted with a power management system according to the first aspect, as no connections between an engine management system and the power management system are necessary for the controller to determine the rate of change of speed of the vehicle.

The controller may be configured to determine if the speed of the vehicle is decreasing. The controller may be configured to determine that the vehicle is in a fourth state and couple the generator to the axle when the vehicle is in the fourth state. The speed of the vehicle may be decreasing in the fourth state. The controller may also be configured to determine if the vehicle is braking, such as based on the real-time location data or other data received by the controller. The vehicle may be braking in the fourth state. Thus if the vehicle is decelerating, e.g. due to braking, the controller may be configured to couple the generator to the axle.

If the vehicle is not decelerating due to braking however, it may be desirable to not couple the generator to the axle. For example, the controller may be configured to determine that the vehicle is in a fifth state and couple the generator to the axle when the vehicle is in the fifth state. The speed of the vehicle may be decreasing but the vehicle may not be braking in the fifth state.

The controller may be configured to determine if the vehicle is travelling on an uphill, downhill or flat surface, based on the real-time location data. The controller may be configured to determine an additional state of the vehicle and decouple the generator from the axle when the vehicle is in the additional state. The speed of the vehicle is decreasing and the vehicle is travelling on an uphill surface when the vehicle is in the additional state. That is, the controller may determine that the vehicle is in the additional state when the vehicle is not decelerating due to braking. If the speed of the vehicle is decreasing and the vehicle is travelling on a flat or downhill surface, or the vehicle speed is substantially constant and the vehicle is travelling on a downhill surface, the controller may determine that the vehicle is braking, and the vehicle may be in the fourth state. That is, the controller may determine that the vehicle is decelerating due to braking.

The controller may determine an incline of a surface on which the vehicle is travelling along, based on the location data. For example, if it is observed that the speed of the vehicle is increasing or decreasing on an uphill surface, the vehicle may be in a state where the controller is configured to decouple the generator from the axle. Accordingly, the consumption of fuel by the engine during uphill travel, which requires a greater motive force, may be reduced.

If it is observed that the speed of the vehicle is decreasing, i.e. the vehicle is decelerating, on a flat surface or a downhill surface based on the location data, the vehicle may be in a state where the controller is configured to couple the generator to the axle. During braking energy is lost. Rather than dissipating all the energy via the brakes, the generator may instead engage the axle such that energy which would otherwise be lost during braking may be converted into electricity using the generator.

The controller may be configured to receive geographical data from the position determination device. The geographical data may be or comprise map data or topological data relating to the location data of the vehicle. The controller may be configured to determine the incline the vehicle is travelling on, based on the geographical data corresponding to the real-time location data of the vehicle.

The geographical data may be or comprise environmental data, such as weather data. The controller may be configured to determine one or more weather conditions affecting the vehicle, based on the geographical data corresponding to the real-time location data of the vehicle. The controller may be configured to determine if a weather condition, such as a headwind or tailwind, is affecting the rate of change of speed of the vehicle.

The vehicle may comprise an inclination sensor, such as an accelerometer, for determining an inclination of the vehicle. Inclination data from the inclination sensor may be used to determine if the vehicle is travelling uphill or downhill.

The controller may be configured to determine a speed of the vehicle. The controller may be configured to decouple the generator from the axle when the speed of the vehicle is less than a minimum speed for generating electricity. Furthermore, the speed of the vehicle may be required to be above a minimum speed for generating electricity to be in the second state. In other words, if the speed of the vehicle is less than a minimum speed for generating electricity via the generator, the controller may be configured to decouple the generator from the axle or not to couple the generator to the axle, even if other conditions would normally prompt it to be coupled. Additionally or alternatively, the controller may be configured to decouple the generator from the axle when the speed of the vehicle exceeds a maximum speed for generating electricity via the generator.

The power management system may comprise any of the one or more sensors aforementioned for also determining the speed of the vehicle, such as the wheel speed sensor or the position determination device.

The generator may be operable to generate electricity over a set window of rotational speeds. As such the generator may not be able to efficiently generate electricity over all the operational speeds of the vehicle, and therefore it may be more efficient to decouple the generator from the axle when the vehicle is travelling at a speed outside of the operational window of the generator.

For example, when the vehicle speed is low, the generator may not be able to efficiently generate electricity. Accordingly, below a minimum speed for generating electricity, the generator may decouple from the axle such that the rate of fuel consumption is decreased when driving the vehicle at low speeds.

The torque required to rotate the generator may also be greater at lower speeds. As such, decoupling the generator from the axle at low speeds may reduce the motive force required to drive the vehicle at low speeds, and accordingly the rate of consumption of fuel at lower speeds may decrease. Decoupling the generator from the axle at low vehicle speeds may therefore increase the efficiency of fuel consumption.

Additionally or alternatively, when the vehicle speed is high, the generator may not be designed to efficiently generate electricity. The rotational speed of the axle may be too great. Accordingly, above a maximum speed for generating electricity, the generator may decouple from the axle such that the rate of fuel consumption is decreased when driving the vehicle at high speeds.

The minimum speed for generating electricity using the generator may be at least 8 kph, at least 10 kph, at least 12 kph, at least 14 kph, or at least 16 kph. The maximum speed for generating electricity using the generator may be at most 96 kph, at most 98 kph, at most 100 kph, at most 102 kph, or at most 104 kph.

The controller is configured to couple or decouple the generator from the axle, depending on the determined state of the vehicle, i.e. based on the determined operating conditions of the vehicle and/or the power management system. The generator may be selectively coupled to the axle using a clutch, or other suitable arrangement. The controller may be configured to operate the clutch accordingly.

The generator may be configured to generate electricity at a different rotational speed than the axle turns. The vehicle speed, and hence the rotational speed of the axle, may differ from the optimum speed for the operating the generator as the vehicle speed varies during transit. The generator may be selectively coupled to the axle via a differential, such that the generator may rotate at a different rotational speed than the axle. This may prevent slipping of the wheels of the vehicle if there is too great a torque difference between the generator and the frictional force on the wheels due to contact with the driving surface. This may also increase the efficiency of electricity generation by the generator, as the generator may be driven by the axle closer to an optimised rotational speed.

The TRU may generally comprise one or more components, such as a compressor, an evaporator fan and a condenser fan. The components of the TRU are powered by the power management system. The transport refrigeration unit may be operated to cool or heat the vehicle, or a monitored environment within the vehicle, depending on the mode of operation. The controller may be configured to operate the load bearing components of the TRU according to a power level of the power management system, e.g. a state of charge of an energy storage device, or based on a rate of energy generation by the generator.

The power management system may include a receiver. The receiver may be configured to receive data via wireless transmission. The receiver may be a wireless module.

The controller may be in communication with a cloud network, which may provide data relating to the driving of the vehicle or data on which the determination of the rate of change of the speed of the vehicle, or whether the vehicle is braking or not, may be based on. For example, if the vehicle is a trailer of a tractor-trailer system, the power management system may be configured to receive data relating to one or more operational parameters of the tractor, relayed via the cloud network. These operational parameters can be used to determine corresponding operational parameters of the trailer. Alternatively, the data may relate to one or more operational parameters of an engine management system of the vehicle, such that data the one or more operational parameters may be relayed from the engine management system to the power management system.

Viewed from a second aspect of the present invention, there is provided a tractor-trailer system for transporting goods, the tractor-trailer system comprising: a tractor for driving a trailer; and the trailer, wherein the trailer is the vehicle of the first aspect.

The tractor-trailer system of the second aspect may have one or more or all of the features (including optional features) of the vehicle of the first aspect. Thus the above description may be equally applicable to the tractor-trailer system of the second aspect.

The tractor may comprise an engine management system. The engine management system may comprise a plurality of sensors configured to determine one or more operational parameters of the tractor. The controller may be configured to receive one or more of the operational parameters from the engine management system. The controller may be configured to determine the speed of the trailer or the rate of change of speed of the trailer based on the operational parameters from the engine management system.

The tractor drives the trailer, and hence the trailer will accelerate and brake in tow with the tractor. As such, the operational parameters of the tractor may be equally applicable to the trailer and hence may be suitable for determining the rate of change of speed of the trailer.

By determining the rate of change of the trailer based on the operational parameters from the engine management system, the power management system may more reliably determine the rate of change of speed of the trailer. Accordingly, the power management system may more efficiently couple and decouple the generator from the axle as required, such that the tractor may consume fuel more efficiently during operation of the tractor-trailer system.

One of the operational parameters may be a brake pedal position. The controller may be configured to determine if the brake pedal is depressed and/or engaged. The controller may be configured to determine that the trailer is in a fourth state and couple the generator to the trailer when the vehicle is in the fourth state. The brake pedal may be depressed and/or engaged when the vehicle is in the fourth state.

Brake pedal position will be understood to be the position of the brake pedal of the tractor. When the brake pedal is engaged, the braking system of the tractor will be activated such that the tractor-trailer system will decelerate, i.e. its rate of change of speed will be substantially less than zero. During braking, energy is lost from the tractor-trailer system. Rather than dissipating all the energy via the brakes, the generator may instead engage the axle such that energy which would otherwise be lost during braking may be converted into electricity using the generator.

Other operational parameters may include, for example, tractor speed, accelerator pedal position, total fuel usage, fuel level, engine speed and vehicle distance. The operational parameters may be measured and/or determined using known sensors, techniques or methods.

The engine management system may have one or more or all of the features of the engine management system of the first aspect. Thus the above description may be equally applicable to the engine management system of the second aspect.

The engine management system may be in wireless communication with the power management system. The engine management system may be wirelessly connected to the power management system. The wireless connection may be regarded as a wireless interface. The engine management system may exclusively be in wireless communication with the power management system. That is, there may be no wired and/or electrical contact connections between the power management system and the engine management system.

By providing the engine management system in wireless communication with the power management system, there is no need to provide a wired connection between the engine management system and the power management system. Such wired connections may be complex between the engine management system and the power management system, and may require regular maintenance. Further, as a trailer of a tractor-trailer system is interchanged between various tractors as part of a fleet, disconnecting and reconnecting a wired transmission may be time consuming and may be prone to error. Further, wireless communications may be less susceptible to user error due to the automatic, rather than manual, connection.

The provision of a wireless connection may also allow for the reliable transmission of data between the engine management system and the power management system. As described above, the engine management system may comprise a plurality of sensors configured to determine and/or measure one or more operational parameters of the tractor. These parameters can include one or more of: vehicle speed, clutch activation, handbrake activation, brake pedal position, cruise control activation, accelerator pedal position, total fuel usage, fuel level, engine speed, gross axle weight rating, total engine active runtime, fuel management system data, vehicle identification number, tachograph data, high-resolution vehicle distance, service distance and engine coolant temperature.

By reliably transmitting the operational parameters from the engine management system to the power management system, the power management system may be able to more reliably manage power usage and regeneration, and may be able to more accurately determine whether or not to couple the generator to the axle. Accordingly, the reliable transmission of the operational parameters, and data between the power management system and the engine management system, may enable the further optimisation of fuel consumption by the tractor of the tractor-trailer system.

The trailer may comprise a first wireless module. The first wireless module may be in communication with the controller. The first wireless module may be part of the power management system. The first wireless module may be configured to both send and receive wireless transmissions.

The tractor may comprise a second wireless module. The second wireless module may be in communication with the engine management system. The second wireless module may be part of the engine management system. The second wireless module may be configured to both send and receive wireless transmissions.

The first wireless module may be configured to automatically connect to the second wireless module. The first wireless module and the second wireless module may be configured to automatically connect when the first wireless module is in range of the second wireless module. For example, the first wireless module and the second wireless module may be configured to automatically connect when the trailer is attached to the tractor.

By automatically connecting, the trailer may be able to easily and readily be detached from one tractor, before being attached to a second tractor. Upon attachment to the second tractor, the wireless modules may automatically connect, such that the trailer may readily communicate with the second tractor. As such, tractors and trailers may be more readily interchanged, e.g. as part of a fleet within a logistics network.

The first wireless module and the second wireless module may readily connect due to the first wireless module recognising and detecting automatically the second wireless module. The first wireless module may be configured to send a token or key to the second wireless module. The second wireless module may be configured to send an acknowledgement to the first wireless module, in response to the token or key. The first wireless module and the second wireless module may connect as a result.

The first wireless module may be located on a wall adjacent to a cabin of the tractor. The second wireless module may be located on a back wall of or behind the cabin of the tractor. Accordingly, the first wireless module and the second wireless module may be positioned such that they are in close proximity to one another when the trailer is attached to the tractor. The signal strength of the wireless connection may be improved as a result, compared to if the wireless modules were disposed on opposing ends of the tractor-trailer system.

The first wireless module and the second wireless module may communicate via CAN bus communication protocol. The first wireless module may communicate with the power management system via CAN bus communication protocol. The second wireless module may communicate with the engine management system via CAN bus communication protocol.

The first wireless module and/or the second wireless module may be configured to transmit and receive wireless communications using any known wireless communication protocol, including but not limited to: Bluetooth, Bluetooth low energy (BLE), ZigBee, 6LoWPAN, WiFi, 2G, 3G, 4G, 5G, NFC, RFID, LTE or any other known wireless communication protocol.

In a further aspect, there is provided a tractor-trailer system for transporting goods, the tractor-trailer system comprising: a tractor for driving a trailer, wherein the tractor comprises an engine management system; and the trailer, wherein the trailer comprises a transport refrigeration unit and a power management system for powering the transport refrigeration unit; and wherein the power management system is in wireless communication with the engine management system.

The tractor-trailer system may have one or more or all of the features of the vehicle of the first aspect and/or the tractor-trailer system of the second aspect. Thus the above description may be equally applicable to the tractor-trailer system of the above-described example.

Viewed from a third aspect of the present invention, there is provided a method of operating a power management system for powering a transport refrigeration unit, the method comprising: monitoring a rate of change of speed of a vehicle comprising an axle, the power management system and the transport refrigeration unit; determining that a vehicle is in a first state and decoupling a generator from the axle when the vehicle is in the first state, wherein the speed of the vehicle is increasing in the first state; and determining that the vehicle is in a second state and coupling the generator to the axle when the vehicle is in the second state, wherein the speed of the vehicle is constant in the second state.

The method of the third aspect may have one or more features corresponding to one or more or all of the features (including optional) features of the vehicle of the first aspect, and/or of the tractor-trailer system of the second aspect. Thus the above description may be equally applicable to the method of the third aspect.

The method of the third aspect may be a method of operating a power management system of the vehicle of the first aspect.

BRIEF DESCRIPTION OF THE DRAWINGS

Certain example embodiments of the invention will now be described by way of example only and with reference to the accompanying drawings in which.

DETAILED DESCRIPTION OF THE INVENTION

Figure 1A:
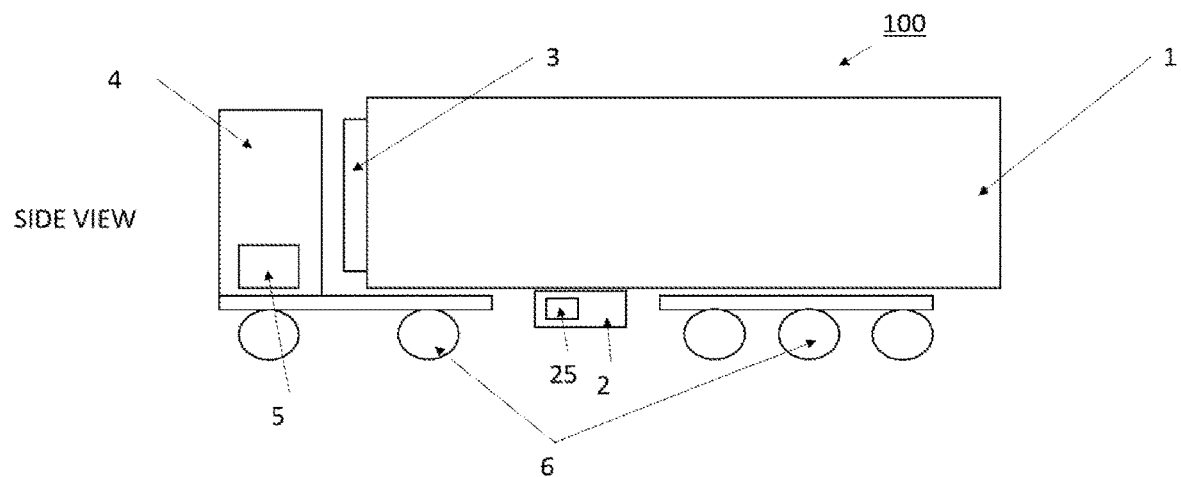
FIGS. 1A and 1B show a side view and a top view respectively of a tractor-trailer system comprising a power management system.
Figure 1B:
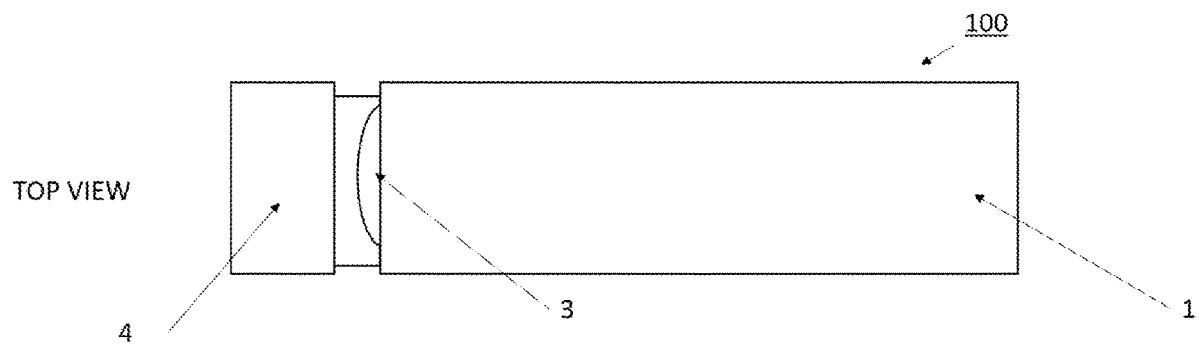

FIG. 1A shows a side view of a trailer 1 comprising a power management system 2 and a transport refrigeration unit (TRU) 3. The trailer 1 is part of a tractor-trailer system 100. FIG. 1B shows a top view of the same tractor-trailer system 100. The tractor-trailer system 100 comprises a tractor 4, which drives the trailer 1. The trailer 1 does not have a means for providing a driving force itself. The tractor 4 comprises an engine, such as a petrol or diesel engine. The engine is part of an engine management system 5. The engine produces a driving force via the combustion of fuel, which in turn drives the tractor-trailer system 100.

The tractor-trailer system 100 comprises a number of wheels 6, each connected to an axle 10. At least one of the axles 10 is actively driven by the engine of the tractor 4. The remaining axles 10 are driven passively by the rotation of the wheels 6 with the driving surface. Additionally, at least one of the passive axles 10 of the trailer 1 is selectively coupled to an electrical axle generator 11.

Figure 2:
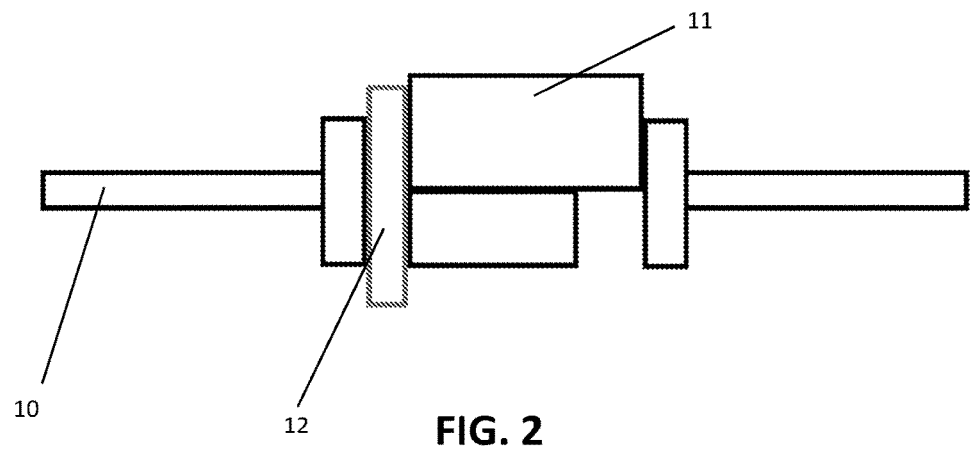
FIG. 2 shows an axle and a generator.

As shown in FIG. 2, the generator 11 is coupled to a shaft of the axle 10 via a gearbox 12. The axle 10 is configured to drive the generator 11 when the generator 11 is coupled to the axle 10, such that electricity can be regenerated via the rotation of the axle 10. Accordingly, the tractor-trailer system 100 can regenerate electricity during driving of the tractor-trailer system 100.

The TRU 3 is powered by the power management system 2. The power management system 2 is arranged to supply electrical power to the TRU 3, such that the energy demand of the TRU 3 is met. The power management system 2 comprises the generator 11 and additionally comprises an energy storage device such as a rechargeable battery 13. The power management system 2 supplies electrical power to the TRU 3 via the generator 11 and/or the battery 13, depending on the demand of the TRU 3. The TRU 3 comprises a number of components that demand power, including a compressor, a condenser fan and an evaporator fan. The battery 13 can also be recharged by connection to an external power source, such as an electrical grid 21, when the tractor-trailer system 100 is not in transit.

The power management system 2 may be able to meet the power demand of the TRU 3 for a longer period of time without recharging the battery 13 using an electrical grid 21, as the power demand may be met or supplemented by the generator 11.

The use of a generator 11 and battery 13 avoids the need for a separate, fuel-burning generator within the trailer 1. However, the generator 11 increases a torque on the axle 10 when the generator 11 is coupled to the axle 10, and hence a larger motive force is required to drive the tractor-trailer system 100. This will increase a rate of fuel consumption by the engine during transport of the trailer 1.

Figure 3:
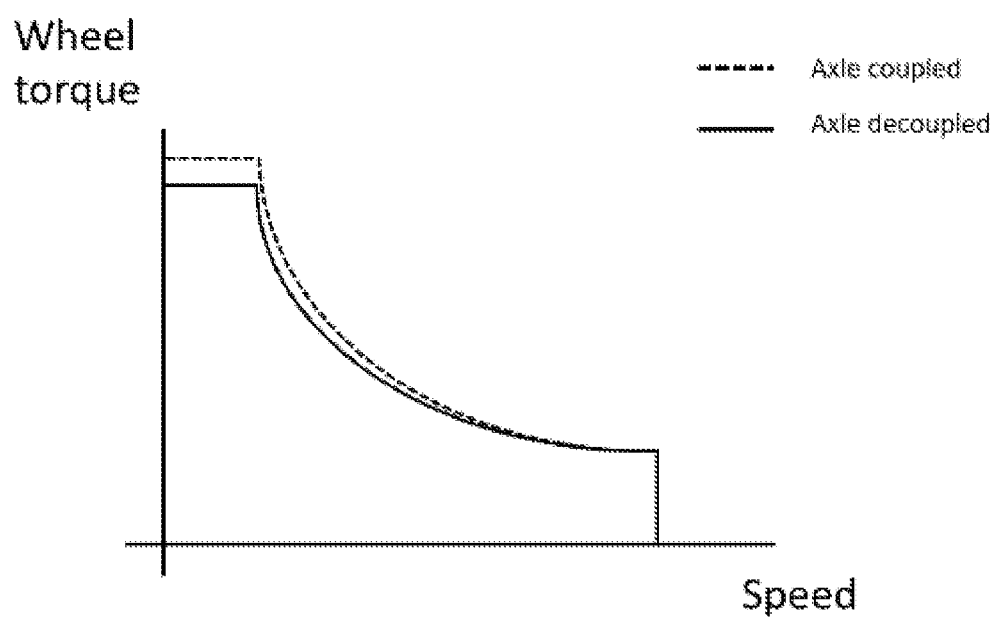
FIG. 3 shows a graph of how wheel torque varies with vehicle speed.

FIG. 3 illustrates how the torque at the wheels 6 varies with vehicle speed, when the generator 11 is coupled to the axle 10 and when the generator 11 is not coupled to the axle 10. The torque at the wheels 6 is greater at lower vehicle speeds, and decreases as the vehicle speed increases. The engine torque at the wheels 6 is also greater when the generator 11 is coupled to the axle 10 versus when it is not. Accordingly, when the generator 11 is coupled to the axle 10, a larger motive force must be provided by the engine such that the necessary engine torque to turn the wheels 6 is provided. The motive force provided by the engine is proportional to the rate of fuel consumption by the engine, and therefore coupling the generator 11 to the axle increases the rate of fuel consumption by the engine.

There are hence a number of instances where it is advantageous to decouple the generator 11 from the axle 10, such that the force required to drive the tractor-trailer system 100 is reduced, and fuel consumption may also be reduced. By selectively coupling and/or decoupling the generator 11 from the axle 10 depending on a determined state of the tractor-trailer system 100, the efficiency of fuel consumption by the tractor-trailer system 100 may be improved.

The power management system 2 comprises a controller 20. The controller 20 is configured to determine a state of the tractor-trailer system 100, and the controller 20 is configured to couple or decouple the generator 11 to or from the axle 10 depending on the current state of the tractor-trailer system 100.

The rate of fuel consumption of the engine generally increases when the vehicle is accelerating, because the motive force required by the engine to cause the vehicle to accelerate is greater than the motive force required to drive the vehicle at a steady speed. Coupling the generator 11 to the axle 10 when the vehicle is accelerating further increases the motive force required to accelerate the tractor-trailer system 100. The rate of fuel consumption of the engine driving the tractor-trailer system 100 is hence further increased when the generator 11 is coupled to the axle 10 during acceleration.

As greater motive force is demanded by the engine, the fuel efficiency of the engine tends to decrease. Decoupling the generator 11 from the axle 10 during acceleration may therefore improve the fuel efficiency of the engine. The controller 20 is therefore configured to account for acceleration of the tractor-trailer system 100 when determining the current state of the tractor-trailer system 100.

It is therefore generally desirable for the controller 20 to couple the generator 11 to the axle 10 when the tractor-trailer system 100 is at a substantially constant speed, and to decouple the generator 11 from the axle 10 when the tractor-trailer system 100 is accelerating. However, other conditions may also affect whether it is appropriate and necessary to generate power from the generator 11. Hence, the controller 20 is configured to take into account a current state of the tractor-trailer system 100 as a whole when determining whether to couple or decouple the generator 11 to or from the axle 10.

The controller 20 is configured to decouple the generator 11 from the axle 10 when the tractor-trailer system 100 is determined to be in a first state in which the tractor-trailer system 100 is accelerating, and where the generation of power is not necessary at that time. Accordingly, at least when the tractor-trailer system 100 is determined to be in the first state, the motive force required by the engine to accelerate the tractor-trailer system 100 can be reduced compared to if the generator 11 remained coupled to the axle 10, and the fuel efficiency of the tractor-trailer system 100 may be improved as a result.

When the controller 20 determines that the tractor-trailer system 100 is in a second state, the controller 20 is configured to couple the generator 11 to the axle 10 such that electricity can be generated by the generator 11 to power the TRU 3. In the second state, the speed of the tractor trailer system 100 remains substantially constant, and the state of the tractor trailer system 100 is otherwise appropriate for generation of power. Although coupling the generator 11 to the axle 10 increases the rate of fuel consumption by the engine, the increase in the rate of fuel consumption in this state will have a lesser impact on fuel efficiency than if the tractor-trailer system 100 was accelerating. Accordingly the TRU 3 can still be powered by the generator 11 whilst more efficiently managing fuel consumption by the engine.

It will be appreciated that ideally when the tractor-trailer system is accelerating the generator 11 will be decoupled from the axle 10, and that ideally when the speed of the tractor-trailer system 100 remains constant the generator 11 will be coupled to the axle 10. In this way, the power management system 2 may improve fuel efficiency whilst still supplying adequate power to the TRU 3 via the generator 11. However, there are also a number of criteria which in various embodiments may be considered by the controller 20, such that the TRU 3 is always adequately powered, or the generator 11 is not unnecessarily coupled to the axle 10. Therefore in each of the first state and the second state, the respective criteria that the vehicle speed is increasing or that the vehicle speed is constant are not necessarily the only criteria that are to be met for the controller 20 to determine that the tractor-trailer system 100 is in either of those specific states.

Figure 4A:
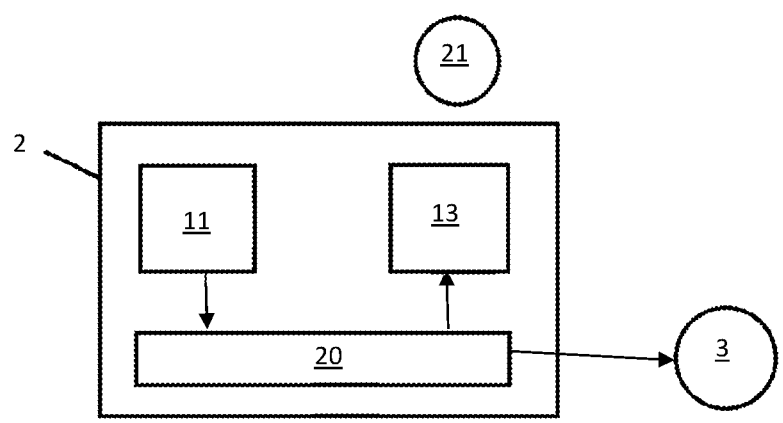
FIGS. 4A to 4C each show schematic diagrams of how power may be distributed by a power management system.
Figure 4B:
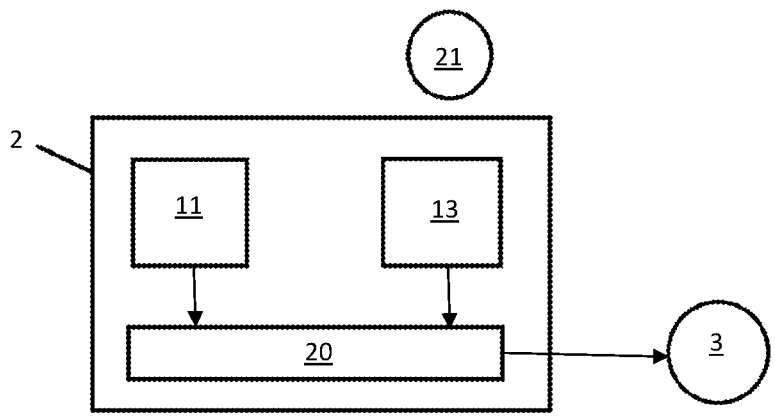
Figure 4C:
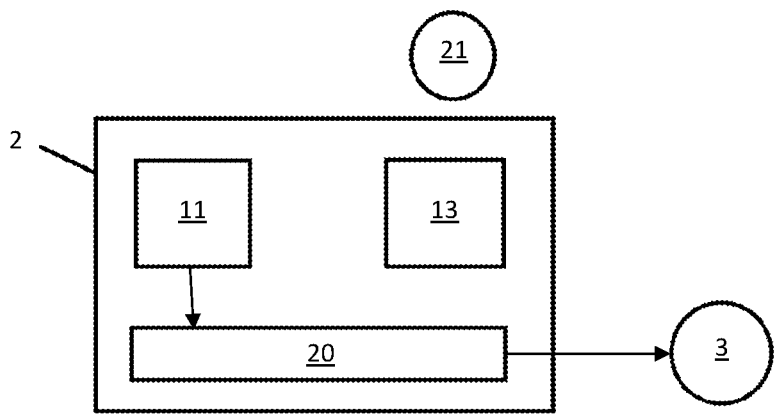

FIGS. 4A to 4C show schematically how power is supplied to the TRU 3 by the power management system 2. The controller 20 is configured to monitor a generation rate of electricity by the generator 11, a state-of-charge of the battery 13, and a power demand of the TRU 3. Depending on each of these monitored variables, and the determined state of the vehicle, the power management system 2 supplies power to the TRU 3 accordingly.

As shown in FIG. 4A, when the power generation rate of the generator 11 is greater than the power demand of the TRU 3, the power management system 2 is configured to power the TRU 3 using the generator 11, and also simultaneously recharge the battery 13 using the generator 11. It follows that this is only possible when the generator 11 is coupled to the axle 10.

As shown in FIG. 4B, when the power demand of the TRU 3 exceeds the generation rate of the generator 11, the power management system 2 is configured to power the TRU 3 using both the generator 11 and the battery 13. The generator 11 and the battery 13 can therefore simultaneously supply power to the TRU 3. Again, it follows that this is only possible when the generator 11 is coupled to the axle 10.

When the generator 11 is not coupled to the axle 10, i.e. such that the generator 11 is not generating electricity, the TRU 3 is powered solely by the battery 13. This will therefore typically be the case when the tractor-trailer system 100 is accelerating.

As the power management system 2 may be required to power the TRU 3 solely using the battery 13, the power management system 2 is configured to recharge the battery 13 when the battery 13 is not sufficiently charged. This may help the power management system 2 ensure that there is adequate electricity available, at least in reserve, to power the TRU 3.

As stated above, the controller 20 monitors the state-of-charge of the battery 13. When the state-of-charge of the battery 13 is lower than a first threshold, the controller 20 is configured to couple the generator 11 to the axle 10 regardless of any other determined criteria. For example even if the tractor-trailer system 100 is accelerating, if the state-of-charge of the battery 13 is not determined to be sufficient the controller 20 will couple the generator 11 to the axle 10. In other words, the controller 11 may be configured to couple the generator 11 to the axle 10 when the state-of-charge of the battery 13 is lower than the first threshold, even in an otherwise undesirable state. The first threshold can be considered as a low-battery threshold, and in various embodiments may correspond to a state-of-charge of at least 20%. The power management system 2 thus prioritises the adequate charging of the battery 13, such that the power demand of the TRU 3 may reliably be met.

FIG. 4C shows how power is distributed to the TRU 3 by the power management system 2 in a third situation, in which the generator 11 alone powers the TRU 3. The generator 11 alone can power the TRU 3 when the generation rate of the generator 3 meets the power demand of the TRU 3.

The fuel efficiency of the tractor-trailer system 100 may be improved by decoupling the generator 11 from the axle 10 when the battery 13 is sufficiently charged, and powering the TRU 3 using solely the battery 13, until the battery 13 has been discharged by a given amount. The controller 20 may therefore be able to determine when the tractor-trailer system 100 is in a third state in which the state-of-charge of the battery 13 is greater than a second threshold. The second threshold corresponds to the battery 13 being sufficiently charged, which in various embodiments may correspond to a state-of-charge of the battery being at least at 95% capacity. When the controller 20 determines that the battery 13 is sufficiently charged, the controller 20 decouples the generator 11 from the axle 10, even if a state of the tractor-trailer system 100 is otherwise suitable for generation of power.

The power management system 2 powers the TRU 3 using solely the battery 13 when the battery 13 is sufficiently charged. The TRU 3 is powered by the battery 13 until the battery 13 has discharged by the given amount, which in various embodiments is at least 15%. Once the battery 13 is no longer sufficiently charged, the controller 20 may again couple or decouple the generator 11 to or from the axle 10 depending on the current state of the tractor-trailer system 100 in order to optimise a rate of fuel consumption of the tractor-trailers system 100.

In an alternative embodiment, the generator 11 can solely power the TRU 3 when the generation rate exceeds the power demand, and the battery 13 is sufficiently charged such that it cannot store the excess power. In this alternative embodiment the excess power is dissipated elsewhere, e.g. via a heat exchanger, or delivered to other components of the power management system 2.

Figure 5:
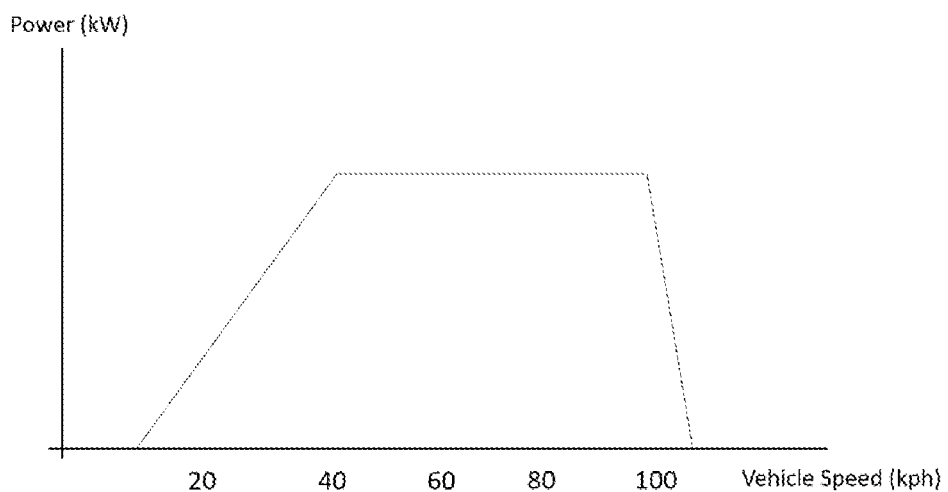
FIG. 5 shows a graph of how generator power varies with vehicle speed.

FIG. 5 shows how a rate of power generation of the generator 11 varies with vehicle speed. The generator 11 generates power depending on its rotational frequency, which is in turn controlled by the gearbox 12 depending on the speed of the tractor-trailer system 100. The generator 11 does not generate adequate power at low rotational frequencies. Thus the tractor-trailer system 100 may not always travel at a speed great enough such that the generator 11 can generate power. When the tractor-trailer system 100 is travelling at a speed which is not sufficient to generate power using the generator 11, decoupling the generator 11 from the axle 10 decreases the motive force required to drive the tractor-trailer system 100 and hence may improve the rate of fuel consumption by the engine at lower speeds compared to if the generator 11 remained coupled to the axle 10.

The controller 20 is configured to determine if the tractor-trailer system 100 is in a state in which the speed of the tractor-trailer system 100 is lower than a minimum speed for generating electricity. In various embodiments the minimum speed is at least 12 kph. In at least one of the states where the speed of the tractor-trailer system 100 is below the minimum speed for generating electricity, the controller 20 is configured to decouple the generator 11 from the axle 10. This state could be an additional state to the states aforementioned. In each of these states, decoupling the generator 11 from the axle 10 when the speed of the tractor-trailer system 100 is not great enough to generate electricity using the generator 11 may improve the fuel efficiency of the tractor-trailer system 100 as the force required to drive the vehicle is not needlessly increased. Conversely, it may be a requirement that in order to couple the generator 11 to the axle 10, the tractor-trailer system 100 is in a state where its speed is equal to or greater than the minimum speed for generating electricity.

The controller 20 is also configured to determine if the tractor-trailer system 100 is braking. If the tractor-trailer system 100 is braking, any electricity generated by coupling the generator 11 to the axle 10 may be regarded as 'free energy', as increasing the torque acting on the wheels 6 is desirable in order to enhance the braking effect.

The controller 20 determines if the tractor-trailer system 100 is in a state in which the tractor-trailer system 100 is braking. One of these states may be regarded as a 'fourth' state. At least when the tractor-trailer system 100 is determined to be in the fourth state, the controller couples the generator 11 to the axle 10. As such, energy otherwise lost due to braking is regenerated.

In various embodiments the controller 20 determines that the tractor-trailer system 100 is braking by monitoring a position of a brake pad or a position of a brake pedal of the tractor 4. When the brake pedal is depressed, the tractor-trailer system 100 is determined to be braking.

The power management system 2 monitors the speed of the trailer 1 (and hence the tractor-trailer system 100) using a variety of methods. In one embodiment, the power management system 2 includes a wheel speed sensor arranged to monitor a rotational speed of the wheel 6. The power management system 2 may also include a position detection device 25, such as a GPS device. The position detection device 25 provides real-time location data to the controller 20 of the power management system 2, such that the speed of the trailer 1 can be determined. Real-time in this context will be understood to mean within at least the last 0.5 seconds.

By providing one or more sensors or devices to monitor the speed of the trailer 1, the power management system 2 can monitor and/or determine the speed of the tractor-trailer system 100 independently from any data generated by the engine management system 5. This is advantageous when the tractor-trailer system 100 is part of a fleet and trailers 1 that are interchanged between tractors 4 at various stages during transit, as the coupling of the trailer 1 to the tractor 4 may be simplified and/or quicker where it is not necessary to physically connect the engine management system 5 of the tractor 4 to the power management system 2 of the trailer 1.

In a preferred embodiment, the power management system 2 is in communication with the engine management system 5, such that the controller 20 receives one or more operational parameters of the tractor 4 from the engine management system 5. As the trailer 1 and the tractor 4 are coupled in the tractor-trailer system 100, many operational parameters which apply to the tractor 4 are also representative of the operational parameters of the tractor-trailer system 100 as a whole. Thus, the operational parameters of the tractor 4 can be used by the power management system 2 in determining the state of the tractor-trailer system 100.

The operational parameters include a brake pedal position. The brake pedal position provides an indication of whether the brakes of the tractor 4 are engaged, and hence whether the tractor-trailer system 100 is braking. As discussed above, the tractor-trailer system 100 is braking in the fourth state, and therefore by monitoring the brake pedal position of the tractor 4, the controller 20 can determine if the tractor-trailer system 100 is in the fourth state.

Other operational parameters provided by the engine management system 5 include: tractor speed, accelerator pedal position, total fuel usage, fuel level, engine speed and vehicle distance. The operational parameters are determined and/or monitored using known sensors and techniques.

To communicate the operational parameters to the power management system 2, the engine management system 5 is connected to the power management system 2. In one embodiment, the power management system 2 may be in communication with the engine management system 5 via a wired connection. However, establishing a wired connection may be complex, and may increase the time taken to change trailers 1 between tractors 4 in a fleet.

Figure 6A:
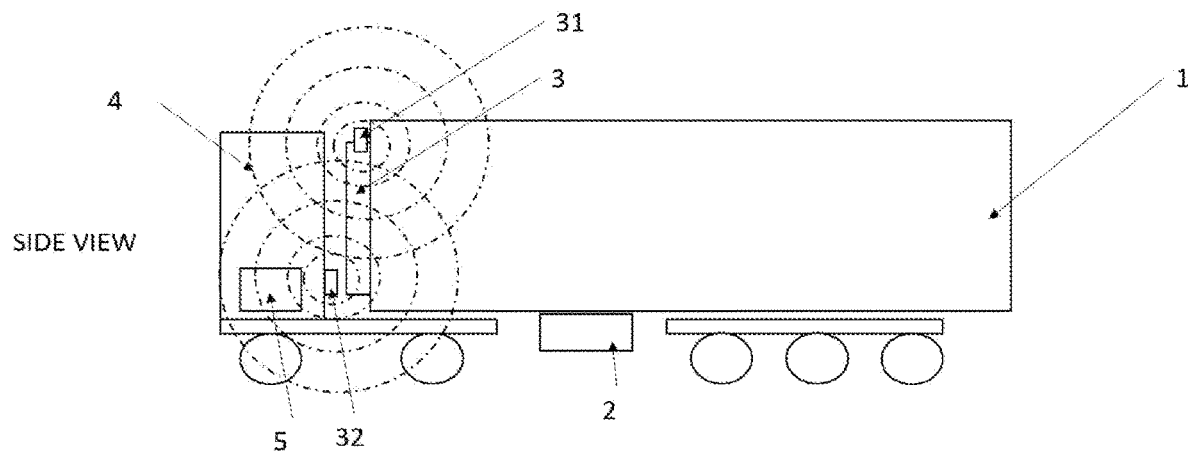
FIGS. 6A and 6B each show a side view of a tractor-trailer system comprising a wireless communications interface between the tractor and the trailer.

FIG. 6A shows a wireless communications interface between the engine management system 5 and the power management system 2, according to the preferred embodiment. The power management system 2 is in communication with a first wireless module 31, and the engine management system 5 is in communication with a second wireless module 32. The first wireless module 31 and the second wireless module 32 are in wireless communication with one another, such that the engine management system 5 and the power management system 2 can wirelessly communicate with each other. That is, the first wireless module 31 and the second wireless module 32 provide a wireless communications interface for the engine management system 5 and the power management system 2. The first wireless module 31 and the second wireless module will communicate via CAN bus communication protocol, and each communicate with the power management system 2 and the engine management system 5 respectively, using CAN bus communication protocol.

The first wireless module 31 is located towards the front of the trailer 1, adjacent to the TRU 3. The second wireless module 32 is located towards the back of the tractor 4. As such, due to how the trailer 1 couples to the tractor 4, the distance between the first wireless module 31 and the second wireless module 31 is reduced, and the strength of wireless communications between the two modules is stronger than if they were to be located at opposing ends of the tractor-trailer system 100.

The first wireless module 31 is configured to automatically connect to the second wireless module 32 when the trailer 1 is coupled to the tractor 4. The communication link is established using known methods and techniques. For example, the first wireless module 31 can be configured to send a token or key to the second wireless module 32, which is recognised and acknowledged by the second wireless module 32. The wireless interface uses any known wireless communication protocol, such as Bluetooth, Bluetooth low energy (BLE), ZigBee, 6LoWPAN, WiFi, 2G, 3G, 4G, 5G, NFC, RFID, LTE or any other known wireless communication protocol.

By providing a wireless communications interface between the engine management system 5 and the power management system 2, a communication link may be more easily established between tractors 4 and trailers 1 which are part of a fleet. Additionally, the power management system 2 can receive more accurate data pertaining to the operation of the tractor-trailer system 100 from the engine management system 5, such that the state of the tractor-trailer system 100 can be more reliably determined.

Figure 6B:
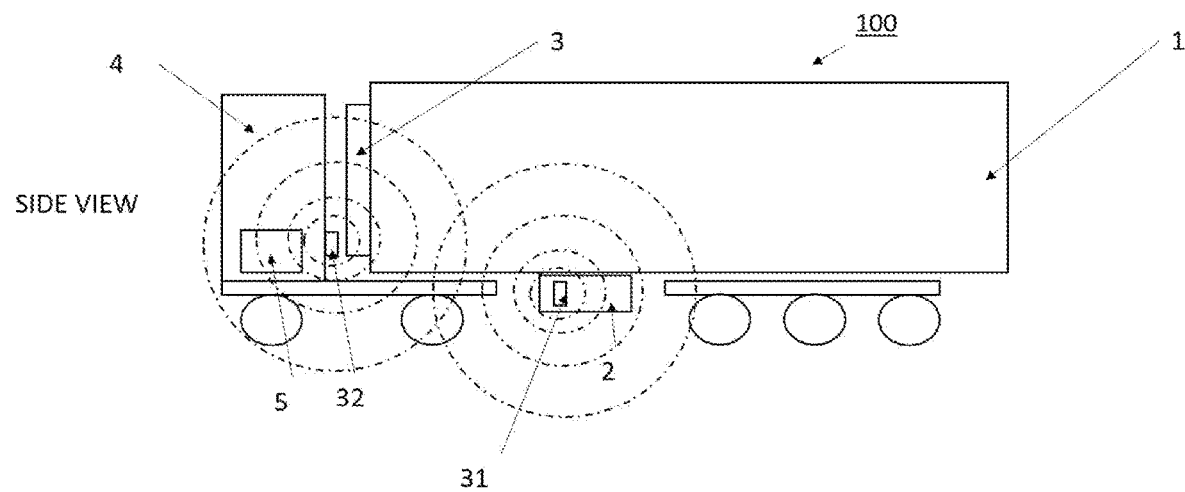

FIG. 6B shows an alternative wireless communications interface between the engine management system 5 and the power management system 2. The first wireless module 31 is located adjacent to the power management system 2, rather than on the front of the trailer 1. The wireless communications interface works similarly to the wireless communications interface as shown in FIG. 6A.

What is claimed is:

1. A vehicle (1) for transporting goods, the vehicle (1) comprising:
   an axle (10);
   a transport refrigeration unit (3); and
   a power management system (2) for supplying power to the transport refrigeration unit (3);
   wherein the power management system (2) comprises:
   a generator (11) configured to be selectively coupled to an axle (10) of the vehicle (1), wherein the generator (11) is configured to generate electricity when coupled to the axle (10); and
   a controller (20) configured to monitor a speed of the vehicle (1) and to selectively couple and decouple the generator (11) from the axle (10);
   wherein the controller (20) is configured to determine that the vehicle (1) is in a first state and decouple the generator (11) from the axle (10) when the vehicle (1) is in the first state, wherein the speed of the vehicle (1) is increasing in the first state; and wherein the controller (20) is configured to determine that the vehicle (1) is in a second state and couple the generator (11) to the axle (10) when the vehicle (1) is in the second state, wherein the speed of the vehicle (1) is substantially constant in the second state.

2. A vehicle (1) as claimed in claim 1, wherein the power management system (2) comprises an energy storage device (13), the energy storage device (13) being operable to power the transport refrigeration unit (3); and wherein the generator (11) is configured to selectively recharge the energy storage device (13).

3. A vehicle (1) as claimed in claim 2, wherein the controller (20) is configured to:

monitor a power demand of the transport refrigeration unit (3); and monitor a power generation rate of the generator (11); and if the power generation rate exceeds the power demand, power the transport refrigeration unit (3) and recharge the energy storage device (13) via the generator (11); and if the power demand exceeds the generation rate, power the transport refrigeration unit (3) via the generator (11) and the energy storage device (13).

4. A vehicle (1) as claimed in claim 2, wherein the controller (20) is configured to monitor a state-of-charge of the energy storage device (13); and wherein the state-of-charge of the energy storage device (13) is less than a first threshold in the second state.

5. A vehicle (1) as claimed in claim 4, wherein the controller (20) is configured to determine that the vehicle (1) is in a third state and decouple the generator (11) from the axle (10) when the vehicle (1) is in the third state, wherein the state-of-charge exceeds a second, higher threshold in the third state.

6. A vehicle (1) as claimed in claim 1, wherein the vehicle (1) comprises a position determination device (25) configured to provide real-time location data for the vehicle (1); and wherein the controller (20) is configured to receive the real-time location data from the position determination device (25) and determine a rate of change of speed of the vehicle (1) based on the real-time location data.

7. A vehicle (1) as claimed in claim 1, wherein the controller (20) is configured to receive braking data for the vehicle (1); and wherein the controller (20) is configured to determine that the vehicle (1) is in a fourth state and couple the generator (11) to the axle (10) when the vehicle (1) is in the fourth state, wherein the vehicle (1) is braking in the fourth state.

8. A vehicle (1) as claimed in claim 1, wherein the speed of the vehicle (1) is above a minimum speed for generating electricity in the second state; and wherein the controller (20) is configured to decouple the generator (11) from the axle (10) when the speed of the vehicle is less than the minimum speed for generating electricity.

9. A tractor-trailer system (100) for transporting goods, the tractor-trailer system (100) comprising:

a tractor (4) for driving a trailer (1); and the trailer (1), wherein the trailer (1) is a vehicle as claimed in claim 1.

10. A tractor-trailer system (100) as claimed in claim 9, wherein the tractor (4) comprises an engine management system (5), the engine management system (5) comprising a plurality of sensors configured to monitor one or more operational parameters of the tractor (4); and wherein the controller (20) is configured to receive the one or more of the operational parameters from the engine management system (5) and to determine a state of the trailer (1) based on the operational parameters.

11. A tractor-trailer system (100) as claimed in claim 10, wherein the one or more operational parameters include a brake pedal position; and wherein the controller (20) is configured to determine that the trailer (1) is in a fourth state and couple the generator (11) to the axle (10) when the trailer (1) is in the fourth state, wherein the brake pedal is depressed in the fourth state.

12. A tractor-trailer system (100) as claimed in claim 10, wherein the one or more operational parameters include a brake pedal position; and wherein the controller (20) is configured to determine that the trailer (1) is in a fifth state and decouple the generator (11) from the axle (10) when the trailer (1) is in the fifth state, wherein the trailer (1) is decelerating and the brake pedal is not depressed in the fifth state.

13. A tractor-trailer system (100) as claimed in claim 10, wherein the engine management system (5) is in wireless communication with the power management system (2).

14. A tractor-trailer system (100) as claimed in claim 13, wherein the trailer (1) comprises a first wireless module (31) in communication with the power management system (2);

wherein the tractor (4) comprises a second wireless module (32) in communication with the engine management system (5); and wherein the first wireless module (31) and the second wireless module (32) are configured to automatically connect when the trailer (1) is attached to the tractor (4).

15. A method of operating a power management system (2) for powering a transport refrigeration unit (3), the method comprising:

monitoring a speed of a vehicle (1) comprising an axle (10), the power management system (2) and the transport refrigeration unit (3);

determining that the vehicle (1) is in a first state and decoupling a generator (11) from the axle (10) when the vehicle (1) is in the first state, wherein the speed of the vehicle (1) is increasing in the first state; and determining that the vehicle (1) is in a second state and coupling the generator (11) to the axle (10) when the vehicle (1) is in the second state, wherein the speed of the vehicle (1) is constant in the second state.

* * * * *